July 11, 1967
C. W. JENKINS
3,330,006
APPARATUS FOR MOLDING OF CONTAINER HEADPIECE
AND CLOSURE THEREFOR
Filed Aug. 14, 1964
2 Sheets-Sheet 1
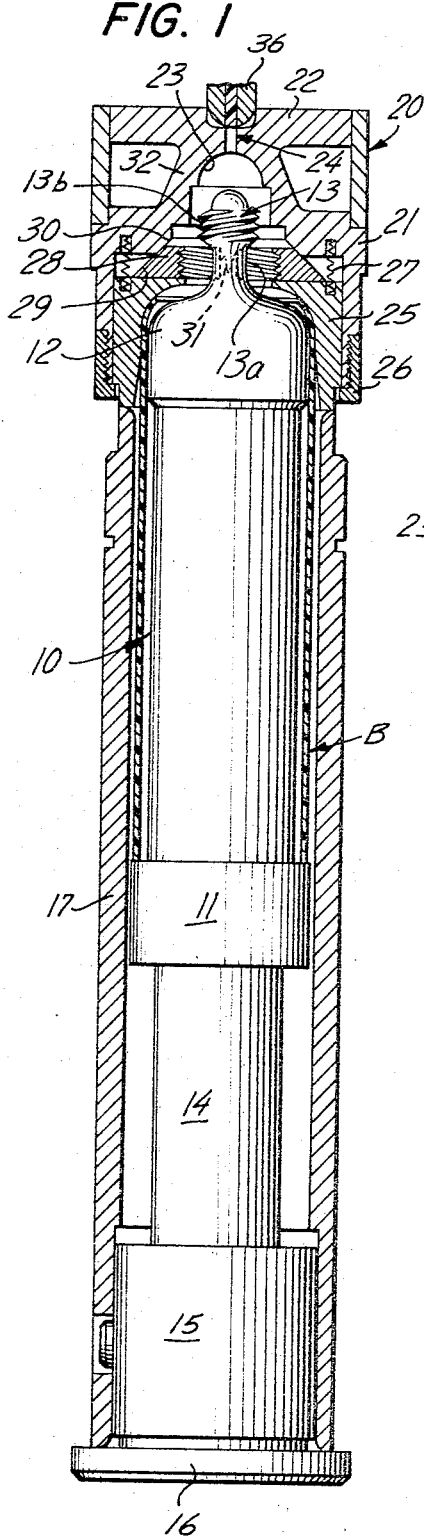
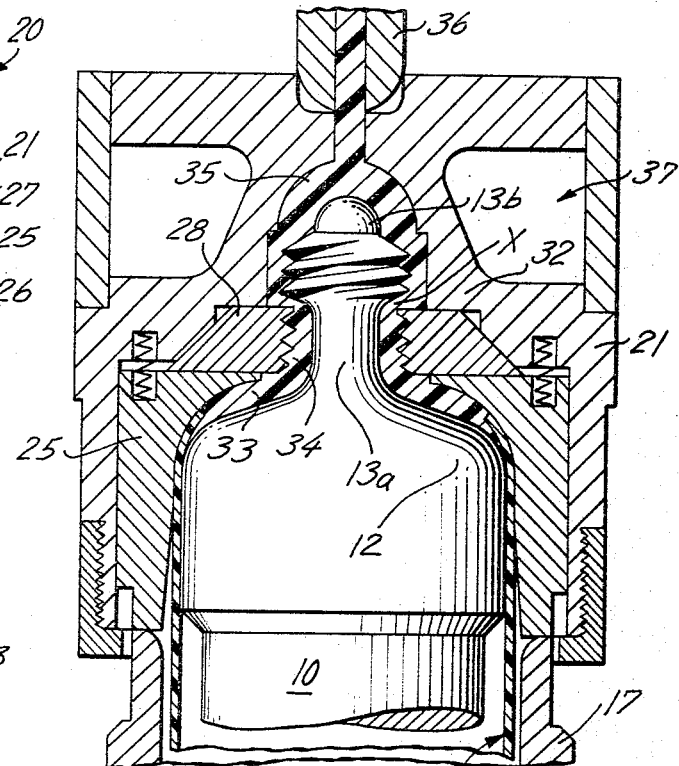
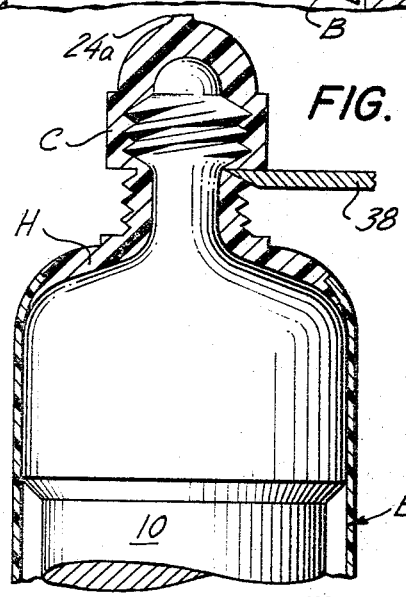
INVENTOR
CHARLES WILLIAM JENKINS
BY
Louie F. Heeb
ATTORNEY July 11, 1967
C. W. JENKINS
3,330,006
APPARATUS FOR MOLDING OF CONTAINER HEADPIECE
AND CLOSURE THEREFOR
Filed Aug. 14, 1964
2 Sheets-Sheet 2
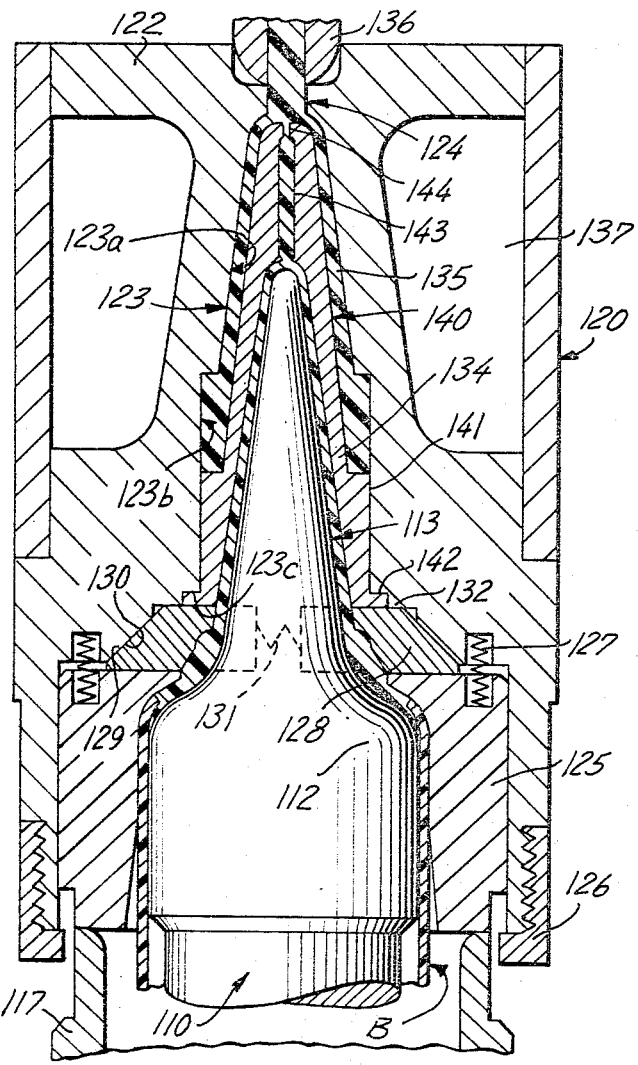
FIG. 5
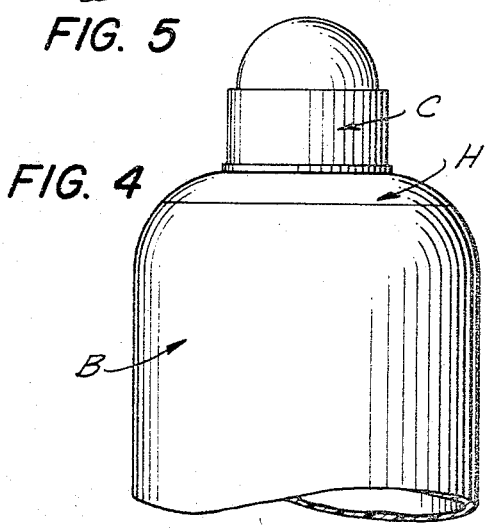
FIG. 4
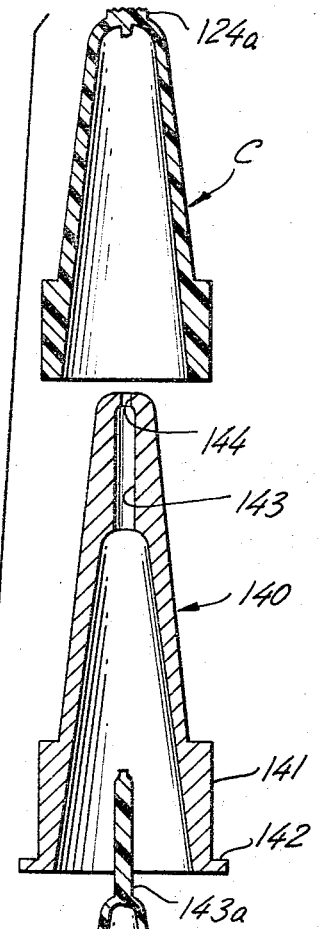
FIG. 6
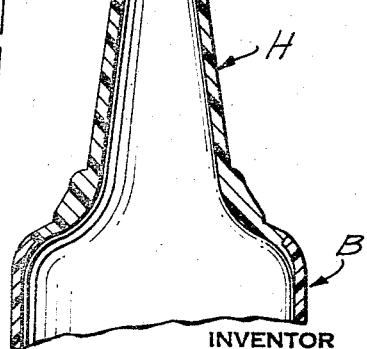
INVENTOR
CHARLES WILLIAM JENKINS
BY *Louis F. Heeb*
ATTORNEY United States Patent Office 3,330,006
Patented July 11, 1967

3,330,006
APPARATUS FOR MOLDING OF CONTAINER HEADPIECE AND CLOSURE THEREFOR
Charles William Jenkins, East Orange, N.J., assignor to American Can Company, New York, N.Y., a corporation of New Jersey
Filed Aug. 14, 1964, Ser. No. 389,602
6 Claims. (Cl. 18—42)

The present invention relates to the manufacture of containers having plastic headpieces and closures, and more particularly is directed to an apparatus for molding in the same operation a headpiece onto a container, such as a collapsible plastic tube, and a closure for the headpiece.

It is well known in the art to manufacture plastic squeeze tubes by molding an integral thermoplastic headpiece to a preformed tubular body. A highly successful technique is that taught in U.S. Patent 2,673,374 to Strahm, and a practical molding apparatus for practicing this technique is disclosed in U.S. Patent 2,812,548 to Qinche et al. A primary object of my invention is the provision of the improved concept of molding a closure for the headpiece at the same time as the headpiece is molded and united to the tubular body.

Another object of my invention is the provision of an apparatus for forming a thermoplastic headpiece onto a thermoplastic body and, in the same tooling and in one operation, molding an integrally connected complementary closure which is thereafter severed from and then applied to the headpiece.

These and other objects and advantages of this invention will become apparent from the following description which, taken in connection with the accompanying drawings and appended claims, discloses a preferred embodiment thereof.

Referring to the drawings:

FIGURE 1 is an elevational view, partly in section, of one form of apparatus for practicing my invention.

FIGURE 2 is an enlarged sectional view of the upper portion of FIGURE 1, showing the mold parts in closed position and the molding step taking place.

FIGURE 3 is an enlarged sectional view depicting a subsequent step in the operation.

FIGURE 4 is a view of the upper end of the finished product, showing the molded closure threaded onto the molded headpiece.

FIGURE 5 is an enlarged sectional view similar to FIGURE 2, showing an alternate form of apparatus and product produced therein.

FIGURE 6 is an exploded view depicting subsequent steps in the operation of the arrangement of FIGURE 5.

The apparatus of FIGURE 1 is constructed to form a threaded-neck headpiece onto a preformed body and a complementary threaded closure for the headpiece. This apparatus comprises a male die member or mandrel generally designated 10, the lower end of which includes a tube body positioning support ring 11 and the upper end of which is provided with a configurated end face including an annular shoulder 12 and neck section 13. Mandrel 10 is mounted to a column 14 rising from an enlarged cylindrical portion 15 having a flanged plate 16 at its base. A force is applied to the bottom of plate 16 to lift mandrel 10 into complementary position with a female die member, hereinafter to be described, to form a closed mold.

Mandrel shoulder 12 is dimensioned to fit snugly within a preformed thermoplastic body B which is sleeved over the mandrel and supported at one end on support ring 11. Ring 11 is spaced below the shoulder 12 a predetermined distance such that the other end of body B protrudes beyond the shoulder, as shown.

Mandrel neck section 13 projects upwardly from shoulder 12 and includes a reduced stem potrion 13a and an enlarged threaded portion 13b. These two neck portions provide the inner confines of two distinct but connected cavities which form, respectively, the neck portion of the headpiece and the closure therefor, in a manner to be described.

Surrounding mandrel 10 in concentric spaced relation is a cylindrical sleeve 17 which extends from support engagement on flange plate 16 upwardly to a predetermined height just below mandrel shoulder 12. When the mandrel is lifted into position in the female die, sleeve 17 also rises to engage and actuate slidable elements within the die, next to be described.

The female die member, depicted generally by the numeral 20, comprises a hollow casing 21 open at its bottom end and closed across its upper region by a solid wall member 22 having a configurated recess 23 into which a central flow passage 24 leads. Mounted within the lower region of casing 21 for vertically sliding movement is an annular matrice 25 interiorly contoured to complement shoulder 12 of the mandrel. Matrice 25 is retained in the casing by a retaining ring 26 threaded to the lower end of the casing, and is biased downwardly away from wall member 22 by the action of a set of springs 27 set in recesses within the matrice and wall member.

Supported on the upper surface of matrice 25 within the hollow casing are a pair of radially slidable segments 28, the outer peripheral edges of which are tapered as at 29 to correspond and slidably engage with an annular tapered wall surface 30 formed in the lower face of member 22. Segments 28 carry thread-forming grooves on their inner surface and are movable toward stem portion 13a of the mandrel section 13 against the bias of a pair of springs 31 mounted in recesses in the segments on opposite sides of the space which receives the mandrel neck section (only one being shown in FIG. 1).

The operation of the apparatus thus far described is similar to that disclosed in aforementioned United States Patent No. 2,812,548. When the mandrel 10 and sleeve 17 are lifted toward female die 20, the upper end of sleeve 17 engages and lifts matrice 25 upwardly into proper position. The matrice in turn engages segments 28, causing them to cam against wall surface 30 and slide radially inwardly to a fixed position determined by their coming to rest against an annular shoulder 32 surrounding recess 23 in wall member 22.

In this "closed" position, as best illustrated in FIGURE 2, mandrel shoulder 12 and the upper inner surface of matrice 25 define an annular space 33 which is sealed at its bottom extremity by the tube body B being tightly pinched between the matrice wall and the mandrel. Segments 28 in their contracted position define in cooperation with stem 13a an annular space 34 extending upwardly from space 33. These two spaces 33, 34 provide the cavity in which a headpiece H is molded and united with the upper end of body B.

Enlarged portion 13b of the mandrel neck is positioned within recess 23 of the wall member 22. This defines an upper cavity 35, connected with the headpiece cavity 33, 34 by a narrow annular space X, in which a closure C is molded integrally with the headpiece H. A molding material, such as a plastified thermoplastic, is then introduced into these cavities through passage 24 from a nozzle 36 connected with a supply source (not shown). Both cavities are filled with a charge substantially simultaneously.

After a short interval to allow the thermoplastic material to cool and set, which may be facilitated by cooling passages 37 formed in wall member 22, the force is removed from end plate 16 allowing the mandrel 10 and sleeve 17 to retract. This permits matrice 25 to slide downwardly and segments 28 to open to their position shown in FIGURE 1, thus enabling the now-molded closure B and headpiece H to be removed with the mandrel as a unit with body B. Thereafter, the narrow connection between the closure and headpiece is broken, such as by severing with a cutting tool 38, after which the severed closure C is stripped from the mandrel and threaded onto the threaded neck portion of headpiece H to provide a closed collapsible tube, such as illustrated in FIGURE 4. On removal from the female die, a sprue fragment, such as at 24a may be present on the top surface of closure C. This is caused by the usual molding sprue present in passage 24 breaking it away at some point within the passage, and of course, may be trimmed away in a conventional manner in a finishing operation.

In FIGURE 5, there is illustrated an alternate embodiment of the invention for molding a headpiece with an elongated tapered spout and matching closure. Since many of the elements of this form of the apparatus are similar to those of the preceding embodiment, in function if not entirely in structure, these elements will be designated by like numerals preceded by the numeral "1."

A mandrel 110 is provided with a shoulder 112, in the same manner as the preceding embodiment, but in this instance the upper mandrel portion projecting above the shoulder is in the form of a long tapered stem 113. Female die 120 also comprises elements similar to the preceding embodiment, but in this instance upper member 122 is of greater axial length so as to accommodate a tapered recess 123 of considerable length. This recess consists of upper tapered region 123a which defines the outer surfaces of a closure cavity 135, a lower cylindrical region 123b and an annular base region 123c for purposes to be explained.

Matrice 125 is identical to that of the preceding embodiment and is held in the outer casing 122 against the bias of springs 127 by a retaining ring 126. Neck segments 128 are also provided which preform a function similar to those previously described; however, rather than being shaped to form threads on the neck of the headpiece being molded are interiorly contoured to provide a simple stop shoulder at the juncture of the headpiece spout and breast. In this instance, the closure C has no threads but rather is adapted to be retained on the headpiece spout by frictional engagement. Of course, it will be understood that the die parts can be modified to provide for threaded or interlocking bead connections, as desired.

The apparatus of FIGURE 5 includes an additional element not present in the preceding embodiment. This is a hollow conical insert, generally designated 140, which defines both the inner surfaces of closure cavity 135 and the outer surfaces of headpiece spout cavity 134. This is necessitated because of dimensional needs required in the combined mold which, unlike the more compact character of the preceding embodiment, must accommodate separated cavities of long, tapered configuration.

Insert 140 includes a lower cylindrical portion 141 which fits snugly within recess region 123b to properly center the insert in the female die, and an annular flange portion 142 at its base which fits within recess region 123c to position the insert axially within the female die. A narrow passage 143, slightly constricted as at 144 at its upper end, extends centrally through the upper tip portion of the insert and provides communication between closure cavity 135 and headpiece cavity 134.

The mold stop is accomplished by flowing a charge of plastified thermoplastic material from a nozzle 136 into passage 124, which charge then separates with part of it filling closure cavity 135 and the remainder flowing through insert passage 143 into headpiece cavity 134.

Upon retraction of sleeve 117, matrice 125 slides downwardly enabling segments 128 to retract to open position. This frees the annular flange 142 of the insert, thus enabling the closure C, insert 140 and headpiece H to be withdrawn from the female die 120 simultaneously as mandrel 110 is retracted. As the die parts thus open, the sprue in passage 124 severs, leaving a slight sprue fragment 124a on the upper tip of closure C which thereafter may be trimmed away in a conventional finishing operation. The closure and headpiece are separated by breaking the connecting sprue formed in insert passage 143. This occurs at the restriction 144, leaving on the tip of the headpiece spout a sprue fragment 143a which is later trimmed off. The insert 140 is thus freed for use again in the next molding operation.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. A molding apparatus for forming a molded headpiece onto a container and a closure therefor, comprising complementary male and female die members, means for moving said members into closed position and means for introducing a molding material into the resulting mold, said female die member including an outer hollow casing having a first recessed region defining the exterior wall of a closure cavity and a second recessed region enclosing an axially slidable element and radially expandable elements which define the exterior surfaces of the shoulder and neck sections, respectively, of a headpiece cavity, said male die member including a first portion complementary with said first recessed region to define the interior surface of said closure cavity, a second portion complementary with said radially expandable elements and defining the interior surface of the neck section of said headpiece, and a third portion complementary with said axially slidable element and defining the interior surface of the shoulder element and defining the interior surface of the shoulder section of said headpiece, said third portion and said axially slidable element serving also to sealingly grip the annular end of a tubular container body sleeved over said male die member and to position same within said headpiece cavity, said male and female die members being so related when in closed position as to provide communication being the closure and headpiece cavities enabling same to be charged by said introducing means.

2. The apparatus of claim 1 wherein said first portion of said male die member and said radially expandable elements have thread-forming means for providing said closure and said neck section, respectively, with cooperable threads.

3. The apparatus of claim 2 wherein said second portion of said male die member is of lesser diameter than said first portion and cooperates with said radially expandable elements to define a neck section cavity communicable through a narrow annular space with said closure cavity.

4. The apparatus of claim 1 wherein said radially expandable elements are movable outwardly sufficient to enable passage of the molded closure on said first portion of said male die member when the latter is extracted from said female die member.

5. The apparatus of claim 1 wherein said first portion of said male die member includes a hollow insert element mountable within said first recessed region of said outer casing, said insert element being centrally supported on said radially expandable elements when in closed position to provide both the interior and exterior surfaces, respectively, of said closure and headpiece cavities, said insert element also having a central passage providing communication between said cavities.

6. The apparatus of claim 3 wherein said insert element is provided with a cylindrical base portion axially slidable within a cylindrical wall of said first recessed region and wherein said radially expandable elements lock said cylindrical portion in position when said die members are closed and open to a position sufficient to enable removal of said insert with said closure thereon when said male die member is extracted from said female die member.

References Cited

UNITED STATES PATENTS

| | | | |
|---|---|---|---|
| 2,812,548 | 11/1957 | Quinche et al. | 18—420 |
| 3,004,285 | 6/1961 | Hagen | 249—59 XR |
| 3,138,279 | 6/1964 | Meissner. | |

FOREIGN PATENTS 1,039,555  12/1954  France.

J. SPENCER OVERHOLSER, *Primary Examiner.*

WILBUR L. McBAY, *Examiner.*